United States Patent
Chang et al.

(10) Patent No.: US 7,058,672 B2
(45) Date of Patent: Jun. 6, 2006

(54) RESONANT PROTECTION KIT FOR POWER SUPPLY

(75) Inventors: Yao-Jen Chang, Pingtung (TW); Yi-Hu Lee, Pingtung (TW); Hurng-Liahng Jou, Kaohsiung Hsien (TW)

(73) Assignee: UIS Abler Electronics Co., Ltd., Hsintien (TW)

( * ) Notice: Subject to any disclaimer, the term of this patent is extended or adjusted under 35 U.S.C. 154(b) by 726 days.

(21) Appl. No.: 10/116,081

(22) Filed: Apr. 5, 2002

(65) Prior Publication Data

US 2003/0088595 A1    May 8, 2003

(30) Foreign Application Priority Data

Apr. 11, 2001 (TW) ................ 90108843 A

(51) Int. Cl.
*G06J 1/00* (2006.01)

(52) U.S. Cl. ............................................. 708/3

(58) Field of Classification Search ............... 323/233, 323/364, 371; 708/3
See application file for complete search history.

(56) References Cited

U.S. PATENT DOCUMENTS

RE28,734 E  *  3/1976  Inoue ..................... 219/69.18
5,600,233 A  *  2/1997  Warren et al. ............ 323/237
5,721,887 A  *  2/1998  Nakajima .................. 713/500

* cited by examiner

*Primary Examiner*—Tan V. Mai
(74) *Attorney, Agent, or Firm*—Bacon & Thomas, PLLC

(57) ABSTRACT

A resonant protection kit for a power supply includes a circuit adapted to perform analysis, determinative, and counter functions. The circuit collects a divided voltage on a capacitor to calculate an effective voltage value and uses fundamental and non-fundamental waveforms to calculate an effective total current value of the capacitor. The circuit is selectively actuated to cut off the capacitor from a power system or adjust its impedance characteristic for protection if an abnormal voltage or current is sensed.

22 Claims, 5 Drawing Sheets

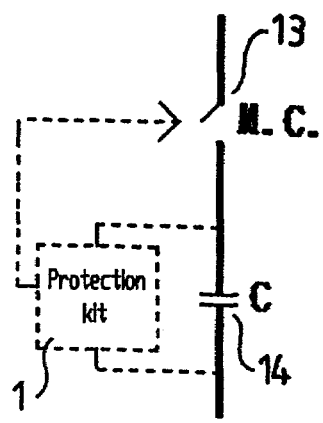
FIG. 3
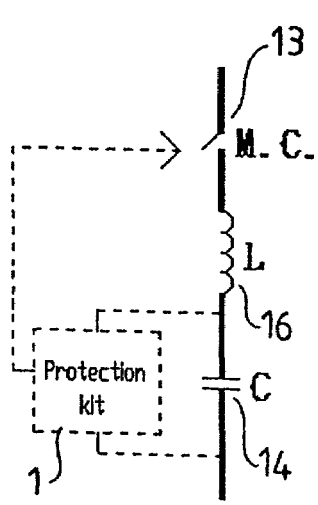 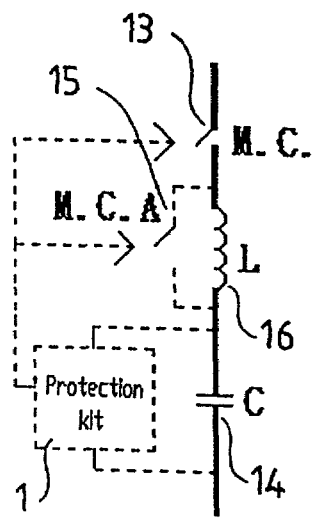 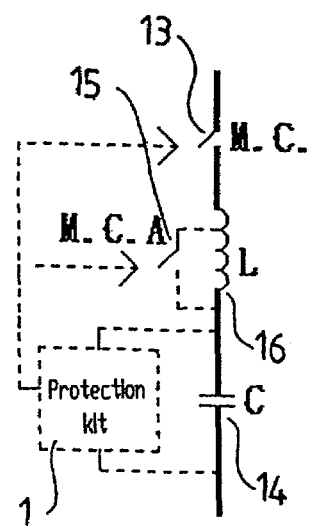
FIG. 4a        FIG. 4b        FIG. 4c

RESONANT PROTECTION KIT FOR POWER SUPPLY

BACKGROUND OF THE INVENTION

1. Field of the Invention

The present invention is related to a resonant protection kit for power supply and more particularly to the resonant protection kit used for avoiding over-voltage/over-current due to resonance phenomenon generated by a combined inductance/capacitor set of an electric power system, which will result in damage to the inductance/capacitor set, so as to achieve the protection of the inductance/capacitor set.

2. Description of the Related Art

In the electric power system most of electrical loads currently are inductance. And in this electric power system power delay occurs due to these inductive loads consuming power. Accordingly, a predetermined real power can be obtained by transmitting a greater current that results in reduction of transmission efficiency in a power distribution system and increasing the possibility of load regulation in its load terminal. In order to solve the above problem, power stations or users add a capacitor set or an automatic power regulator in power line to produce a necessarily inductive load nearby. Capacitance of a capacitor set loaded in a power system is about 25 to 35 percent of total capacitance of power system even as much as about 50 percent in some other power system, as indicated from previous studies.

Electric power devices, technique and facilities such as an Uninterruptible Power Supply, a converter, a rectifier, a frequency converter, and an inverter are widely applied in power distribution system. The load losses of these electric facilities are non-linear input characteristic and the input powers of these electric facilities are low factors. In general, voltage and current of waveform of power transmission and power distribution system are designed to operate under the condition of sine wave of constant-rate frequency. However, when a large number of such non-linear electric facilities are applied, these electric facilities produce different degree of harmonic current and unavailable power. A waveform of the voltage of the power system is distorted due to inputting harmonic current and unavailable power and the distorted waveform results in reduction of power quality. In electric facilities of power system, an inductance is usually connected in series with a capacitor being to be limited reactance or to form a filter. But the inductance and capacitor of these electric facility, however, is severely damaged by these harmonic currents.

In Japan for example, electric component is damaged about 65 percent for inductance and about 26 percent for capacitor in power system by the harmonic current, and the total damage exceed 91 percent. Consequently, the harmonic damaging to the inductance and the capacitor is severe problem.

In harmonic damage problem, damage's reason of an inductance/capacitor set may include over-voltage resulting in insulator damage, or over-current resulting in overheated damage. The voltage/current of all inductance/capacitor set are selectively determined at a normal rated value for operating in normal rated state so the inductance/capacitor set in this normal rated state should not be damaged by over-voltage or over-current. However, the over-voltage/over-current of the inductance/capacitor set may be frequently produced a resonance phenomenon between the main impedance of a power system and its branch impedance of the inductance/capacitor set. When a power distribution system has similar frequencies of harmonics, these harmonics are amplified over ten times that produces over-voltage/over-current and thus the inductance/capacitor set is burnt.

In order to avoid the over-voltage/over-current damaging to the inductance/capacitor set, in common application a power factor improved system or a passive power filter system is usually increased its capacitance grade to solve the resonance phenomenon damaging to the inductance/capacitor set. This solution is not only increase overall cost but also fails to absolutely solve the damage of the inductance/capacitor set. Moreover, increasing capacitance grade of the capacitor set is relative to increase the current grade of its capacitor. Thus the inductance is easily burnt by the resonance phenomenon if its normal rated current is inadequate. This is of a main problem that inductance damage led with about 65 percent, followed by 26 percent for the capacitor damage. Consequently, the previous solution is ineffective for the damage of the inductance/capacitor set caused by the resonance phenomenon.

Power capacitor's tolerance voltage and over-current rule according to IEC831 and IEC871 standards are followings: 1. Operative voltage is determined 110% mean square root of normal rated voltage, including various harmonic voltages (excluding system temporary state) for normal operation; 2. In order to match up system temporary state or abnormal operative conditions, the power capacitor is capable of allowing over-current in a short time according to IEC standard; 3. Operative current is determined 130% mean square root of normal rated current, including fundamental waveform currents and various harmonic currents for normal operation.

TABLE 1

IEC standard for allowance time in transient over-voltage of capacitor

| Continuous allow time | Maximum allowable mean square root of normal rated voltage (%) |
|---|---|
| 1 min. | 130% (1.3 times) |
| 5 min. | 120% (1.2 times) |
| 30 min. | 115% (1.15 times) |
| 12 hr. | 110% (1.1 times) |

According to above IEC standard for tolerance voltage and over-current rule, electric facility (inductance/capacitor set) can avoid damage caused by over-voltage/over-current if it is cut off or changed its impedance characteristic within tolerance time or before over-current exceeding 130%.

The present invention intends to provide a resonant protection kit for power supply which comprises a protection module and senses over-voltage/over-current according to IEC standard, so as to cut off an electric facility from a power system or to adjust its impedance characteristic in such a way to mitigate and overcome the above problem.

SUMMARY OF THE INVENTION

The primary objective of this invention is to provide a resonant protection kit for power supply which senses over-voltage/over-current, so as to cut off an electric facility from a power system or to adjust its impedance characteristic to protect the electric facility.

The present invention is the resonant protection kit for power supply. The resonant protection kit for power supply mainly comprises a circuit being adapted to perform analysis, determinative, and counter function. The circuit collects a divided voltage on a capacitor to calculate an effective voltage value and adopts fundamental and non-fundamental waveform manner to calculate an effective total current value of the capacitor. The circuit is selectively actuated to cut off the capacitor from a power system or adjust its impedance characteristic for protection if an abnormal voltage or current is sensed.

Other objectives, advantages and novel features of the invention will become more apparent from the following detailed description and the accompanying drawings.

BRIEF DESCRIPTION OF THE DRAWINGS

The present invention will now be described in details with references to the accompanying drawings herein:

FIG. 3 is an electrical schematic illustrating the resonant protection kit for power supply applied to a single capacitor and connected in parallel with a power system in accordance with the present invention;

FIGS. 4a–4c are electrical schematics illustrating the resonant protection kit for power supply applied to a capacitor series inductance connected in parallel with a power system in accordance with the present invention;

DETAILED DESCRIPTION OF THE INVENTION

Figure 1:
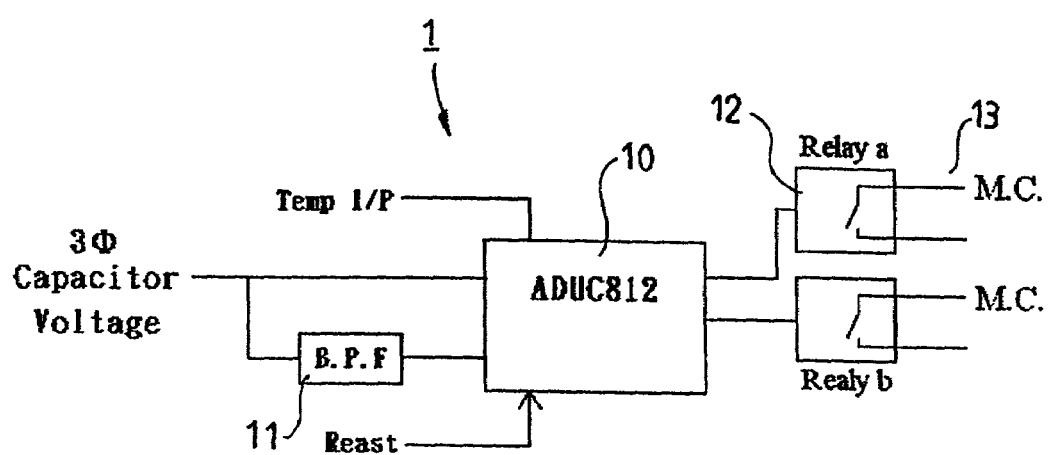
FIG. 1 is a block diagram of a resonant protection kit for power supply in accordance with the present invention.

FIG. 1 illustrates is a block diagram of a resonant protection kit 1 for power supply in accordance with the present invention. The resonant protection kit 1 includes an Y-type resistor dividing the capacitor voltage into a low voltage and two lines. One line is connected to a microcomputer chip (ADUC812) 10 and the other line is connected through a band-pass filter (B.P.F) 11 to the microcomputer chip (ADUC812) 10.

Referring again to FIG. 1, the resonant protection kit 1 includes a microcomputer chip 10, a band-pass filter 11 and at least one relay 12. The microcomputer chip 10 is adapted to perform analysis, determinative, and counter function, and collects a divided voltage of a capacitor to calculate an effective voltage value. The capacitor voltage is filtered by the band-pass filter 11 to produce a non-fundamental waveform and then output to the microcomputer chip 10. This non-fundamental waveform is converted into a non-fundamental current by the microcomputer chip 10. In this manner, the fundamental and non-fundamental currents of the capacitor are calculated to obtain an effective total current value of a capacitor. The relay 12 is controlled to switch on and off a magnetic switch 13 according to the determination of the microcomputer chip 10 for protection.

The resonant protection kit is designed the lowest limits for 110% mean square root of normal rated voltage and 130% mean square root of normal rated current. As to the capacitor series impedance or the current capacity of the inductance of the passive filter, their standard has not been ruled.

The resonant protection kit is used to calculate mean square root of capacitor voltage including harmonic waveform and the mean square root of the capacitor voltage is converted into mean square root of the current. Referring to table 1, before a capacitor is operated under over-voltage in a continuous allow time exceeding the standard of table 1 or the current exceeding 130%, the magnetic switch 13 is controlled to cut off the capacitor or adjust impedance characteristic of a reactor in series connected thereto.

Cutoff time is designed in two grades of the continuous allow time of the standard in order to avoid adding undue or ineffective protection. Referring again to table 1, when over-voltage exceeds 1.1 times, the ruled continuous allow time is 12 hours; when over-voltage exceeds 1.15 times, the ruled continuous allow time is 30 minutes. For example, when the resonant protection kit receives over-voltage 1.1 times, the cutoff time of the resonant protection kit is designed between 12 hours and 30 minutes, so as to effectively protect the capacitor. Similarly, when the resonant protection kit receives over-voltage 1.15 times, the cutoff time of the resonant protection kit is designed between 30 and 5 minutes; when the resonant protection kit receives over-voltage 1.2 times, the cutoff time of the resonant protection kit is designed between 5 and 1 minutes; when the resonant protection kit receives over-voltage 1.3 times, the cutoff time of the resonant protection kit is designed between 1 minutes and 15 seconds. These cutoff times lead the continuous allow time of the IEC standard, in order to ensure protecting the capacitor.

As over-voltage is occurred, the resonant protection kit starts to count (accumulating power). If this over voltage is attenuated within a preset cutoff time, the resonant protection kit decreases the internal count time (decreasing power) to achieve real operative effect.

Figure 2:
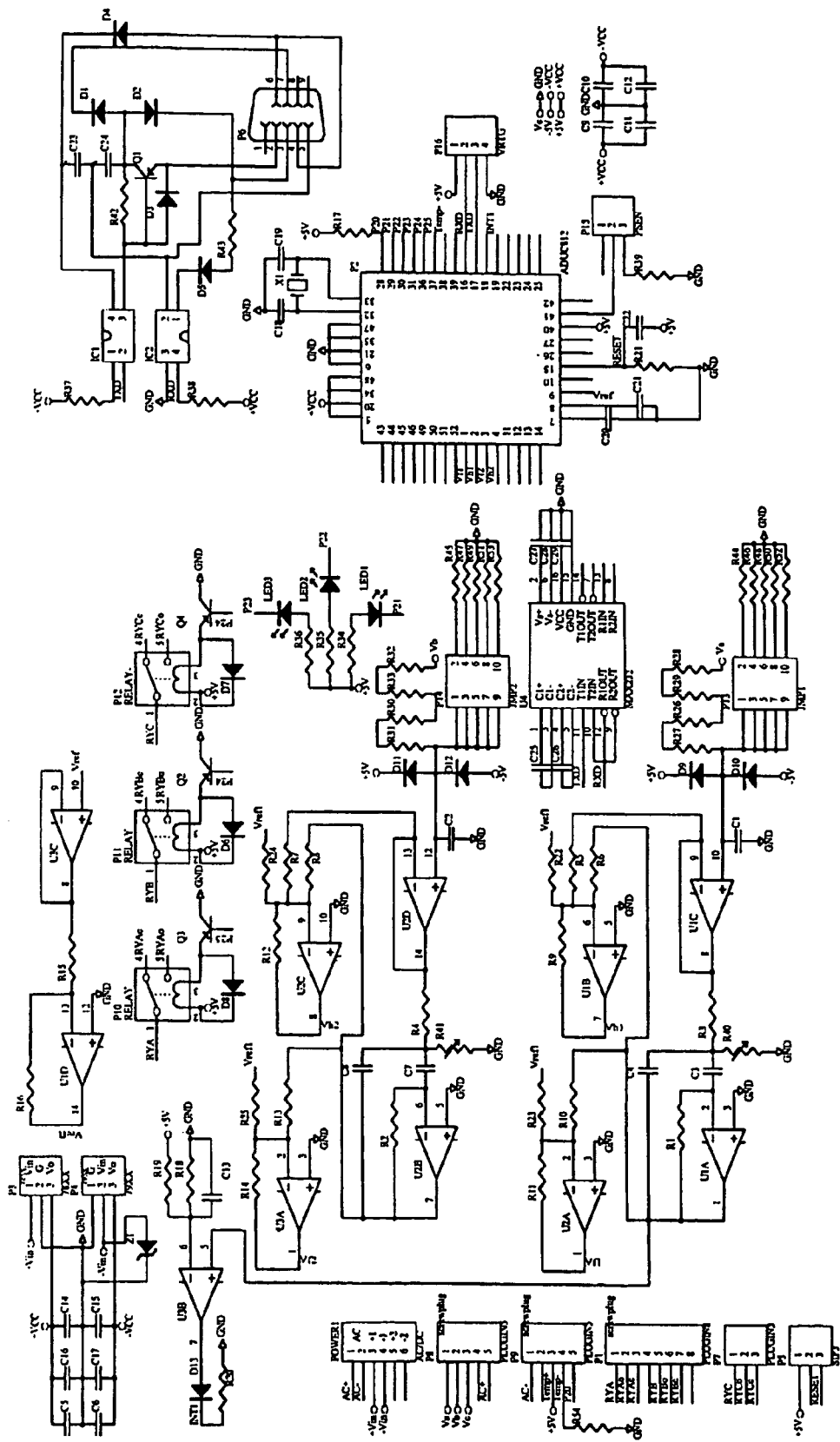
FIG. 2 is a circuit diagram of the resonant protection kit for power supply in accordance with the present invention.

FIG. 2 illustrates a circuit diagram of the resonant protection kit for power supply and includes a microcomputer chip of the resonant protection kit and each functional layout thereof.

In a power distribution system a capacitor set has two connecting manners. One manner is connected the capacitor set in parallel to a system bus and the other manner is initially connected the capacitor set in series with a reactor and then connected them in parallel to the system bus. The capacitor set in the power distribution system includes a single capacitor system and an Automatic Power Factor Regulator (APFA) system, it will be described in following detailed description.

Single Capacitor System

FIG. 3 illustrates a resonant protection kit for power supply applied to a single capacitor and connected in parallel with a power system. Referring to FIG. 3, the thick line is a system line and the dotted lines are the resonant protection kit 1 and connection lines of the system connected thereto.

Referring again to FIG. 3, the resonant protection kit 1 of the present invention is used to sense over-voltage/over-current on the capacitor 14. As the resonant protection kit 1 receives over-voltage/over-current, it outputs a signal to the relay 12 to control the magnetic switch 13 in order to cut off the capacitor 14.

FIGS. 4a–4c illustrate the resonant protection kit for power supply applied to a capacitor series inductance connected in parallel with a power system. These drawings illustrate a resonant protection kit 1 applied to a capacitor 14 connected in series to an inductance 16 in three application manners which are cutoff system, inductance's short-circuit and adjusting inductance. Referring to FIGS. 4a–4c, the thick lines are system lines and the dotted lines are the resonant protection kit 1 and connection lines of the system connected thereto. The resonant protection kit 1 shown in FIGS. 4b–4c is added a magnetic switch (M.C.A) 15 with respect to that shown in FIG. 4a.

Referring again to FIG. 4a, the resonant protection kit 1 of the present invention is used to sense over-voltage/over-current on the capacitor 14. As the resonant protection kit 1 receives over-voltage/over-current, it outputs a signal to the relay 12 to control the magnetic switch 13 in order to cut off the capacitor series inductance 14 and 16.

Referring again to FIG. 4b, as the resonant protection kit 1 receives over-voltage/over-current, it outputs a first signal to the first relay 12a to control the magnetic switch (M.C.A) 15 for skipping over the inductance 16 and reducing voltage of the capacitor 14. In this manner, the resonant frequency of the system is attenuated, so as to avoid the system's resonant amplifying the voltage/current. If the resonant protection kit 1 still receive over-voltage/over-current, it further output a second signal to the second relay 12b to control the magnetic switch (M.C.) 13 for cutting off the capacitor series inductance 14 and 16.

Referring again to FIG. 4c, as the resonant protection kit 1 receives over-voltage/over-current, it outputs a first signal to the first relay 12a to control the magnetic switch (M.C.A) 15 for adjusting a contact position of the inductance 16 and changing the inductance thereof. In this manner, the resonant frequency of the system is attenuated. If the resonant protection kit 1 still receives over-voltage/over-current, it further output a second signal to the second relay 12b to control the magnetic switch (M.C.) 13 for cutting off the capacitor series inductance 14 and 16.

Referring again to FIGS. 4a–4c, the resonant protection kit 1 is added the magnetic switch (M.C.A) 15 so that the entire system can avoid malfunction due to over-voltage/over-current caused by resonant. Thus, the resonant protection kit 1 can be applied to a passive filter.

Automatic Power Factor Regulator (APFR) System

Currently, APFR system is separated into three sections 6, 10, and 12. The capacitor is also separated into two types depending to whether it is in series connected to an inductance:

a. Series Inductance Type

A capacitor of the APFR system is connected in series to an inductance for absorbing harmonics, so as to reduce a current of a magnetic switch inputting into it. Connecting construction of the resonant protection kit and APFR system has three application types, as shown in FIGS. 5a–5c.

Figures 5A, 5B:
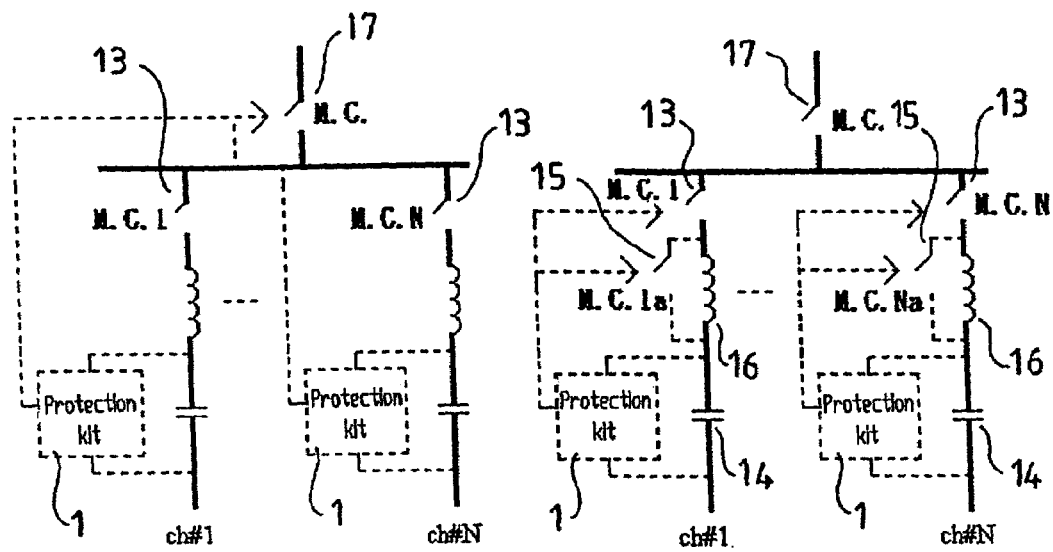
FIGS. 5a–5c are electrical schematics illustrating the resonant protection kit for power supply applied to an inductance series APFR system in accordance with the present invention.
Figure 5C:
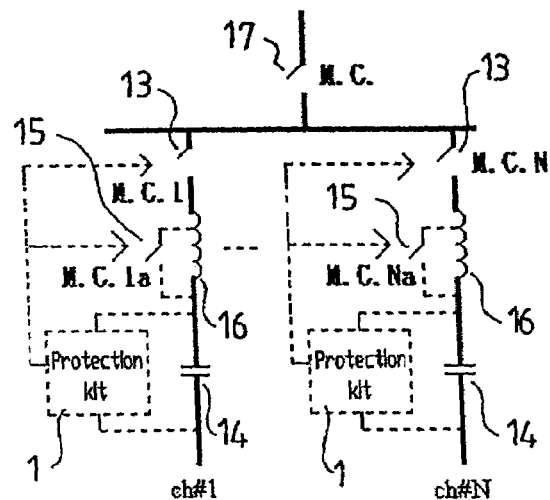

FIGS. 5a–5c illustrate the resonant protection kit for power supply applied to an inductance series APFR system in accordance with the present invention. These drawings illustrate a resonant protection kit applied to the inductance series APFR system in three application manners which are cutoff system, inductance's short-circuit and adjusting inductance. Referring to FIGS. 4a–4c, the thick lines are system lines and the dotted lines are the resonant protection kit 1 and connection lines of system connected thereto. The resonant protection kit 1 shown in FIGS. 5b–5c is added a magnetic switch (M.C.A) 15 on each branch line with respect to that shown in FIG. 5a.

Referring again to FIG. 5a, the resonant protection kit 1 of the present invention is used one for each section of the APFR system and to sense over-voltage/over-current on the capacitor 14. As one of the resonant protection kit 1 receives over-voltage/over-current, it outputs immediately a signal to control the magnetic switch 17 in order to cut off the APFR system for malfunction.

Referring again to FIG. 5b, the resonant protection kit 1 of the present invention is used one for each section of the APFR system. The resonant protection kit 1 comprises a magnetic switch 15 on each inductance 16. As the resonant protection kit 1 receives over-voltage/over-current, it outputs immediately a first signal to control the magnetic switch (M.C.N.A) 15 for skipping over the inductance 16 and reducing voltage of the capacitor 14. In this manner, the resonant frequency of the system is attenuated, so as to avoid the system's resonant amplifying the voltage/current and the APFR system's malfunction. If the resonant protection kit 1 still receive over-voltage/over-current, it further output a second signal to control the magnetic switch 13 for cutting off the branch line of the capacitor.

Referring again to FIG. 5c, the resonant protection kit 1 of the present invention is used for an APFR system having a divided terminal. The resonant protection kit 1 comprises a magnetic switch 15 on each inductance 16. As the resonant protection kit 1 receives over-voltage/over-current, it outputs immediately a first signal to control the magnetic switch 15 for adjusting the terminal of the inductance 16 and changing the inductance thereof. In this manner, the resonant frequency of the system is attenuated. If the resonant protection kit 1 still receives over-voltage/over-current, it further output a second signal to control the magnetic switch 13 for cutting off the branch line of the capacitor.

b. Inductanceless Type

Figure 6:
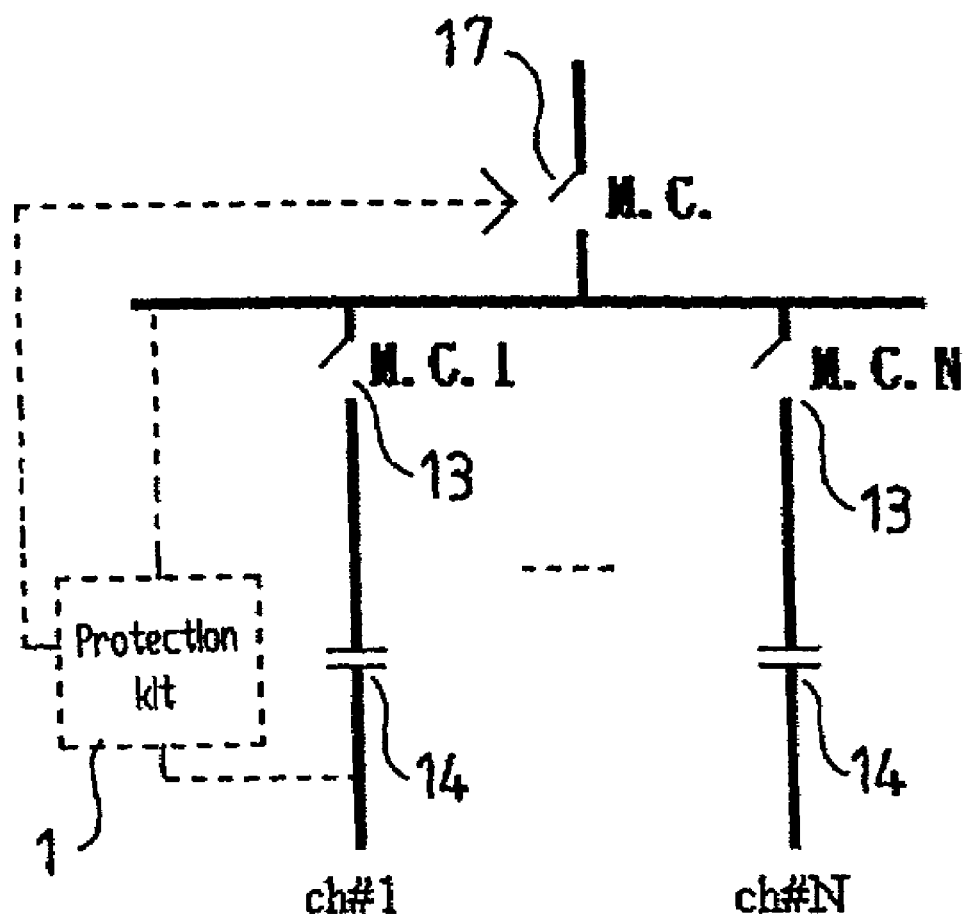
FIG. 6 is an electrical schematic illustrating the resonant protection kit for power supply applied to an inductanceless type of an APFR system in accordance with the present invention.

FIG. 6 illustrates the resonant protection kit for power supply applied to an inductanceless type of an APFR system.

Referring to FIG. 6, the APFR system is an inductanceless type and only needs a resonant protection kit 1. As the resonant protection kit 1 receives over-voltage/over-current, it outputs immediately a signal to control the magnetic switch 17 in order to cut off the APFR system. Once the over-voltage/over-current is sensed, the APFR system is immediately occurred malfunction.

The resonant protection kit of the present invention has the following main functions:

(1) Over-Voltage Protection

The resonant protection kit of the present invention is designed for over-voltage according to IEC standard. The resonant protection kit is automatically sensing over-voltage (including harmonic), timer, and controlling magnetic switch cutting off the capacitor, as shown in table 1. The resonant protection kit of the present invention is ruled, as shown in table 2.

TABLE 2

Resonant protection kit's rule for allow time in transient over-voltage

| Rated voltage times | 1.1 | 1.15 | 1.2 | 1.3 |
|---|---|---|---|---|
| IEC allow time | 12 hr. | 30 min. | 5 min. | 1 min. |
| Allow time | 1 hr. | 15 min. | 3 min. | 30 sec. |

(2) Over-Current Protection

The resonant protection kit of the present invention is designed for over-current according to IEC standard and the criterion of over-current is 130%. The resonant protection kit of the present invention is ruled, as shown in table 3.

TABLE 3

Resonant protection kit's rule for allow time in transient over-current

| Rated current times | 1.3 | 2.0 |
|---|---|---|
| Allow time | 30 sec. | 0 sec. |

(3) Deviation Frequency Effect

The resonant protection kit of the present invention is designed for operation under a rated frequency 60 Hz (or 50 Hz). When the resonant protection kit is operated in the range of ±3 Hz, it is capable of stably switching the magnetic switch to protect the capacitor set even though its allow time is increased or decreased.

(4) Inductance's Overheat Protection

In the APFR system or passive filter, overheat usually burns an inductance. The resonant protection kit of the present invention is also designed for overheat protection. As the resonant protection kit receives an overheat signal, the APFR system or passive filter is cut off to avoid an occurrence of overheat damage.

Although the invention has been described in details with references to its presently preferred embodiment, it will be understood by one of ordinary skill in the art that various modifications can be made without departing from the spirit and the scope of the invention, as set forth in the appended claims.

What is claimed is:

1. A resonant protection kit for a power supply, comprising:
   a circuit adapted to perform analysis, determinative, and counter functions, and to collect a divided voltage of a capacitor to calculate an effective voltage value;
   the circuit further using fundamental and non-fundamental waveforms to calculate an effective total current value of the capacitor; and
   the circuit being selectively actuated to cut off the capacitor from a power system or adjust its impedance characteristic for protection if an abnormal voltage or current is sensed.

2. The resonant protection kit for a power supply as defined in claim 1, wherein the circuit calculates a mean square root of capacitor voltage including a harmonic waveform, and the mean square root of the capacitor voltage is converted into a mean square root of the current.

3. The resonant protection kit for a power supply as defined in claim 1, wherein the circuit is a microcomputer single chip for performing the analysis, determinative, and counter functions.

4. The resonant protection kit for mpower supply as defined in claim 3, further comprising a band-pass filter arranged to filter the capacitor voltage to produce a non-fundamental waveform, and then output the non-fundamental waveform to the computer chip; and wherein a fundamental current and the non-fundamental current of the capacitor are calculated to obtain an effective total current value of the capacitor.

5. The resonant protection kit for a power supply as defined in claim 4, wherein a Y-type resistor divides the capacitor voltage into a low voltage and two lines; and wherein one line is connected to a microcomputer chip and the other line is connected through a band-pass filter to the microcomputer chip.

6. The resonant protection kit for a power supply as defined in claim 3, further comprising a relay controlled to switch on and off a magnetic switch according to the determination of the microcomputer chip for protection; wherein the computer chip controls the magnetic switch via the relay for cutting off the capacitor from the power system or adjust its impedance characteristic for protection.

7. The resonant protection kit for a power supply as defined in claim 1, wherein the circuit has lowest limits of 110% mean square root of normal rated voltage and 130% mean square root of normal rated current.

8. The resonant protection kit for a power supply as defined in claim 1, wherein the kit is applied to a single capacitor.

9. The resonant protection kit for a power supply as defined in claim 8, wherein the capacitor is combined with a capacitor series inductance connected in parallel to a system bus.

10. The resonant protection kit for a power supply as defined in claim 9, wherein the kit is applied to directly cut off the capacitor series inductance from the system bus.

11. The resonant protection kit for a power supply as defined in claim 9, wherein the kit is applied in an inductance's short-circuit matter to skip over the inductance and reduce the voltage of the capacitor.

12. The resonant protection kit for a power supply as defined in claim 11, wherein if the kit still receives over-voltage/over-current, it further outputs a signal to a relay to control a magnetic switch, cutting off the capacitor series inductance.

13. The resonant protection kit for a power supply as defined in claim 9, wherein the kit is applied in an adjusting inductance manner that reduces the voltage of the capacitor.

14. The resonant protection kit for a power supply as defined in claim 13, wherein if the kit still receives over-voltage/over-current, it further outputs a signal to a relay to control a magnetic switch for cutting off the capacitor series inductance.

15. The resonant protection kit for a power supply as defined in claim 1, wherein the kit is applied to an APFR system.

16. The resonant protection kit for a power supply as defined in claim 15, wherein the aPFR system is connected in series to a capacitor.

17. The resonant protection kit for a power supply as defined in claim 16, wherein as the kit receives over-voltage/over-current, it outputs immediately a signal to control a magnetic switch in order to cut off the APFR system for a malfunction.

18. The resonant protection kit for a power supply as defined in claim 16, wherein the kit is applied to directly off the capacitor series inductance from the system bus.

19. The resonant protection kit for a power supply as defined in claim 18, wherein if the kit still receives over-voltage/over-current, it further outputs a signal to control a magnetic switch for cutting off a branch line of the capacitor.

20. The resonant protection kit for a power supply as defined in claim 16, wherein the kit is applied in an adjusting voltage manner to reduce the voltage of the capacitor.

21. The resonant protection kit for a power supply as defined in claim 20, wherein if the kit still receives over-voltage/over-current, it further outputs a signal to control a magnetic switch for cutting off a branch line of the capacitor.

22. The resonant protection kit for a power supply as defined in claim 15, wherein the kit is applied to an inductanceless type of the APFR system, and wherein as the kit receives over-voltage/over-current, it outputs immediately a signal to control a magnetic switch in order to cut off the APFR system for a malfunction.

* * * * *